Aug. 5, 1958 — O. W. MOAK — 2,846,419
REMOVING RESIDUAL CATALYST FROM RESIN POLYMERIZATE
Filed Nov. 10, 1955
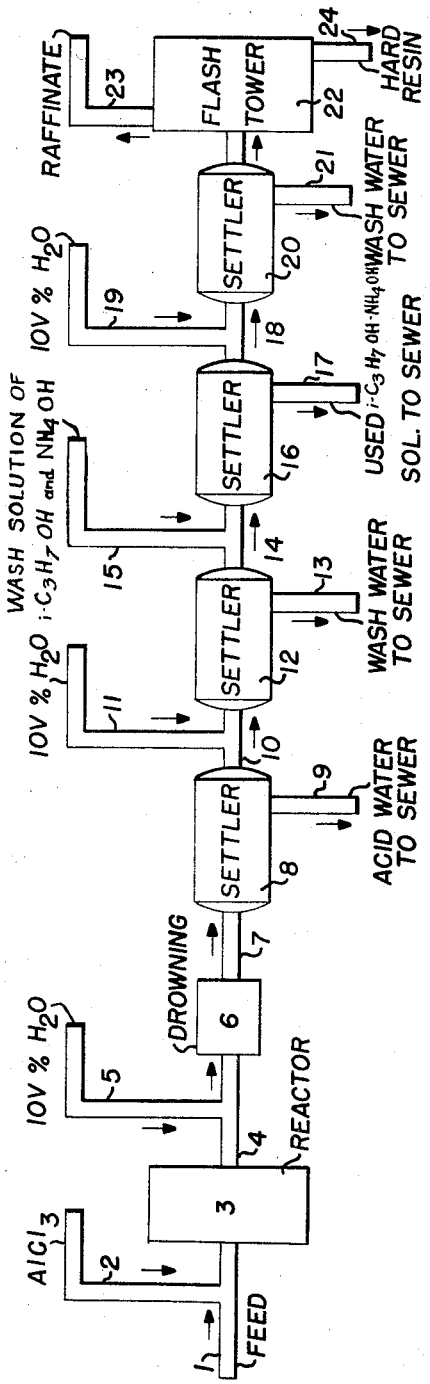
Ottis Webster Moak — Inventor
By  Attorney United States Patent Office 2,846,419
Patented Aug. 5, 1958

2,846,419

REMOVING RESIDUAL CATALYST FROM RESIN POLYMERIZATE

Ottis Webster Moak, Baton Rouge, La., assignor to Esso Research and Engineering Company, a corporation of Delaware Application November 10, 1955, Serial No. 546,181

2 Claims. (Cl. 260—82)

This invention relates to an improved method for removing catalyst residues and relates more particularly to the removal of residues of Friedel-Crafts catalysts, such as aluminum chloride, used in the polymerization of various types of unsaturated hydrocarbons.

Many type of hydrocarbon polymerizations employ metal halides of the Friedel-Crafts type as catalyst. Among these polymerizations is the polymerization of steam-cracked petroleum streams to produce solid resins. Aluminum chloride is the most generally used of the Friedel-Crafts catalysts, but aluminum bromide, titanium tetrachloride and zirconium tetrachloride are used also.

At the end of the reaction the product must be treated to completely destroy residual catalyst and to prevent the product from going off color. It is known that a good proportion of the catalyst is actually bound up with the polymer, i. e. it terminates the polymer chain. If this catalyst is not released from the polymer and destroyed, the resulting product is so color unstable as to be unmarketable. Various materials have been used for this purpose. For example, alcohols, such as methanol and ethanol, and alkalis, such as sodium hydroxide, can be used. Sodium hydroxide is used because of its convenience, ready availability, and cheapness. However, it has been found that even under the best conditions, small amounts of chlorides still remain in the resin and adversely affect the color.

It has now been found that more complete removal of chlorides from the polymer product can be obtained by washing the reactor effluent with a mixture of an alcohol and aqueous ammonia. The alcohol functions to make the chlorides accessible to the ammonia. Hence sufficient alcohol for this purpose is necessary. At least the stoichiometrical amount of ammonia to react with the chlorides should be present.

The invention is particularly adapted to processes for the polymerization of solid resins from steam-cracked liquid petroleum fractions boiling in the range of 20 to 280° C. Intermediate fractions boiling within this range, such as the 30–60° C. or the 30–120° C. fraction, may also be used advantageously.

In the process generally known as steam cracking, liquid petroleum fractions such as naphtha, kerosene, gas oil, residual, and the like, are cracked at relatively low pressures and at temperatures of 1000 to 1500° F. in the presence of steam and for relatively short contact times. The gas and liquid streams produced contain large quantities of diolefins and olefins, particularly in the $C_5$ to $C_{12}$ range. The naphtha distillate streams obtained by steam cracking operations contain large amounts of diolefins, olefins, aromatics and some paraffins and naphthenes. A typical stream shows 20% diolefins, 51% olefins, 21% aromatics, and 2% paraffins and naphthenes.

In the production of resins these naphtha distillate streams are treated with 0.25-2.5% of a Friedel-Crafts type catalyst such as aluminum chloride, aluminum bromide, boron trifluoride and the like, or solutions, slurries or complexes thereof. The reactions are conducted at temperatures in the range of —50 to +100° C. (preferably —35 to +75° C.). The product is a substantially non-aromatic unsaturated hydrocarbon resin, since analysis indicates that little of the aromatic constituents of the feed enters the composition. The color of the resin ranges from light amber to dark brown, depending on the starting materials and other factors. Reference is made to co-pending applications Serial No. 312,466, filed October 1, 1952, now U. S. 2,734,046; Serial No. 312,569, filed October 1, 1952, now abandoned; and Serial No. 318,002, filed October 31, 1952, now abandoned, for details of the preparation of these resins.

The manner in which the present invention is carried out will be fully understood from the following description when read with reference to the accompanying drawing.

A steam-cracked petroleum fraction boiling in the range of 20° C. up to about 240° C., largely 20° C. to 130° C. from which all the cyclic diolefins have been removed is introduced into line 1 and mixed with about 1.0% aluminum chloride introduced through line 2. This mixture is introduced into reaction zone 3 at a temperature of 20° C. Reactor effluent is removed through line 4 and contacted with 10% by volume of water introduced through line 5. The mixture of water and effluent is passed to agitator 6 where the resin solution is thoroughly mixed with the water which dissolves the major portion of the aluminum chloride. The agitated mixture is then passed by line 7 to settler 8 where the water settles to the bottom and is drawn off to the sewer through line 9. The washed resin solution is removed from settler 8 through line 10 and mixed with a second 10% by volume of water introduced through line 11. This mixture is passed to settler 12 where the water settles to the bottom carrying further quantities of aluminum chloride with it. The water is drawn off to the sewer through line 13. The washed resin solution, removed from settler 12 through line 14 is contacted with a wash solution, introduced through line 15, consisting of a mixture of equal portions by weight of isopropyl alcohol and 30% aqueous ammonia. This mixture is passed to settler 16 and the used wash solution is removed through line 17 and passed to the sewer. The resin solution is withdrawn from settler 16 by line 18 and again contacted with 10% by volume of water introduced through line 19 to remove residual amounts of alcohol and ammonia. This mixture is passed to settler 20 from which the water is passed to the sewer through line 21. The washed resin solution from settler 20 is passed to flash tower 22 from which unreacted portions of the feed and light polymer fractions are removed through line 23, leaving a hard resin which is taken off through line 24.

When a reactor effluent from a plant operating in accordance with the above described process using the mixture of isopropyl alcohol and 30% aqueous ammonia as the wash liquid the stripped resin was found to contain 139 p. p. m. of chlorides compared with 340 p. p. m. when a wash solution consisting of 10 volume percent of a sodium carbonate solution was used. Thus the method of the present invention affords a means of radically decreasing the amount of residual chlorides with the result that the product is much more color stable.

The nature of the present invention having been thus fully set forth and specific examples of the same given, what is claimed as new and useful and desired to be secured by Letters Patent is:

1. A method for preparing a resin-containing, substantially chloride-free hydrocarbon solution which comprises treating steam-cracked liquid $C_5$—$C_{12}$ olefin- and diolefin-containing petroleum fractions with 0.25-2.5 wt. percent of aluminum chloride, washing the resulting resin-containing reaction mixture to substantially remove said aluminum chloride therefrom, then contacting the washed resin-containing hydrocarbon solution with a wash solvent consisting essentially of isopropyl alcohol and at least the stoichiometrical amount of about 30% ammonium hydroxide required to react with the remaining chlorides, and separating the chloride-containing wash solvent from the substantially chloride-free, resin-containing hydrocarbon solution in a settling zone.

2. A process for preparing a substantially non-aromatic and chloride-free hydrocarbon resin which comprises treating a steam-cracked liquid $C_5$—$C_{12}$ olefin- and diolefin-containing petroleum fraction with 0.25–2.5 wt. percent of aluminum chloride at a temperature in the range of —50 to +100° C., passing the resulting resin-containing reaction mixture to a washing zone where said mixture is washed with water, passing the resulting aqueous mixture to a settling zone, where separating the chloride-containing water phase from the water-washed resin-containing hydrocarbon solution, passing said solution to a second washing zone where said water-washed solution is contacted with a wash solvent mixture consisting essentially of isopropyl alcohol and at least the stoichiometrical amount of about 30 wt. percent ammonium hydroxide required to react with the chlorides remaining in said water-washed solution, passing the resulting mixture of hydrocarbon solution and wash solvent to a second settling zone, there separating the chloride-containing solvent from the resin-containing, substantially chloride-free hydrocarbon solution, passing said chloride-free solution to a flashing zone wherein unreacted portions of the feed and light polymer fractions are stripped overhead as raffinate, and recovering the resulting color-stable, hard resin product from said flashing zone.

References Cited in the file of this patent
UNITED STATES PATENTS

| | | |
|---|---|---|
| 2,023,495 | Thomas | Dec. 10, 1935 |
| 2,062,845 | Thomas et al. | Dec. 1, 1936 |